Figure 1:
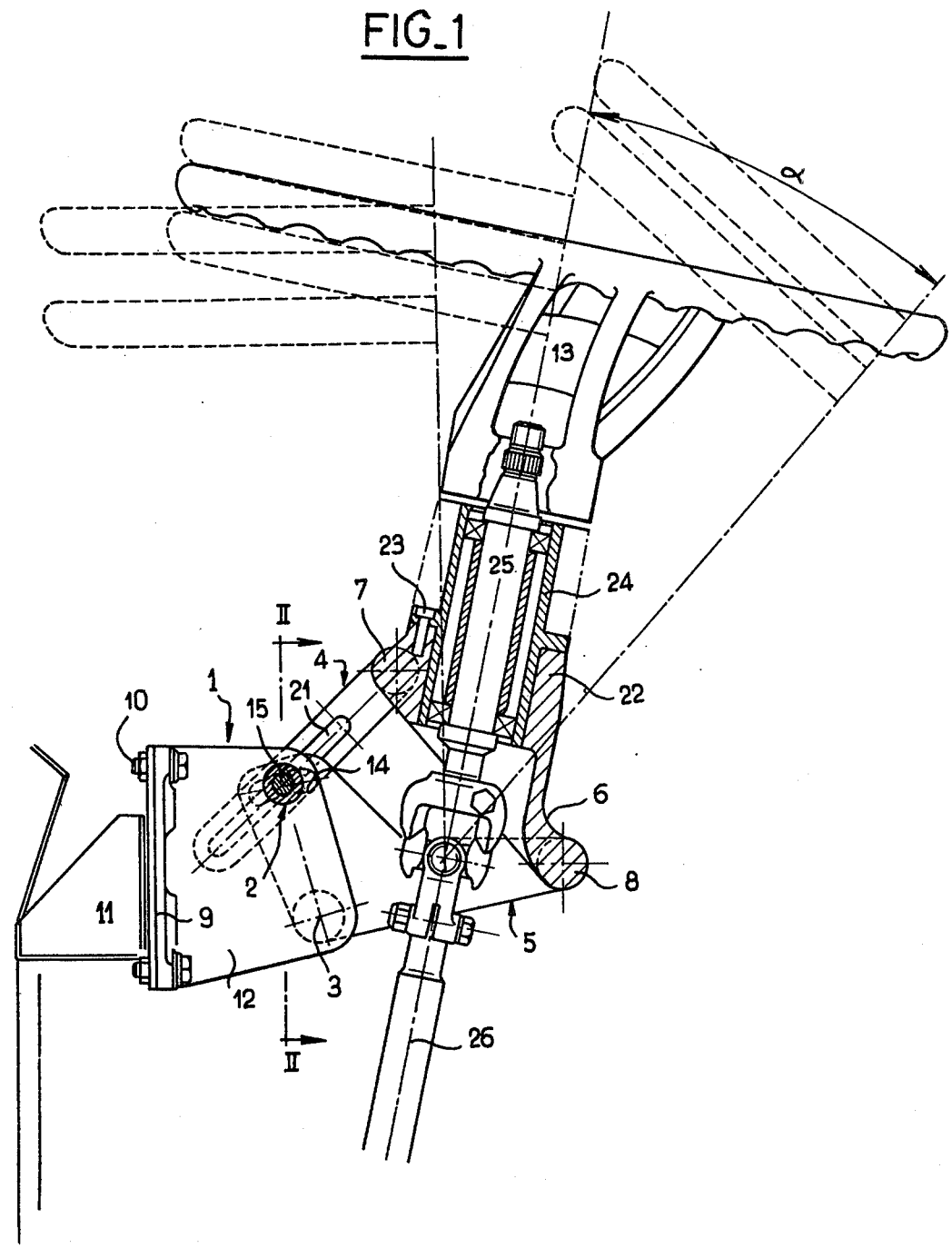

United States Patent [19]

Soler Bruguera

[11] 4,449,419
[45] May 22, 1984

[54] SYSTEM FOR ADJUSTING THE POSITION OF A STEERING WHEEL ON A VEHICLE

[75] Inventor: Raimon Soler Bruguera, Barcelona, Spain

[73] Assignee: Bendiberica S.A., Barcelona, Spain

[21] Appl. No.: 283,591

[22] Filed: Jul. 15, 1981

[30] Foreign Application Priority Data

Jul. 30, 1980 [ES] Spain .................................. 494.694

[51] Int. Cl.³ ............................................. B62D 1/18
[52] U.S. Cl. ........................................ 74/493; 74/531; 280/775
[58] Field of Search .................... 74/493, 531; 280/775

[56] References Cited

U.S. PATENT DOCUMENTS

| | | | |
|---|---|---|---|
| 2,826,090 | 3/1958 | Grinnell | 74/493 |
| 2,865,222 | 12/1958 | Bachman | 74/493 |
| 2,988,931 | 6/1961 | Markley | 74/493 |
| 3,279,277 | 10/1966 | Stevens | 74/493 |
| 3,504,569 | 4/1970 | Zoltok | 74/493 |
| 3,691,866 | 9/1972 | Berkes | 280/775 |
| 3,737,003 | 6/1973 | Beals | 74/493 |
| 3,974,707 | 8/1976 | Nagano | 74/493 |
| 4,240,305 | 12/1980 | Denaldi | 74/493 |

*Primary Examiner*—R. P. Machado
*Attorney, Agent, or Firm*—Paul David Schoenle; Ken C. Decker

[57] ABSTRACT

According to the invention, the system comprises a movable support holding the steering wheel and comprised of a four link articulated quadrilateral mechanism having a base link, two crank links, one link being adjustable longitudinally and the other link being slope adjustable and a rod link hinged to said crank links and supporting the steering wheel.

6 Claims, 2 Drawing Figures

FIG_1

SYSTEM FOR ADJUSTING THE POSITION OF A STEERING WHEEL ON A VEHICLE

The invention concerns a system for adjusting the position of the steering wheel of a vehicle, especially one of the type which has a rotating support for a shaft which raises the steering wheel and is connected to the steering system by means of an articulated transmission device; this support will be hinged to a fixed base so that it oscillates within the axial plane and at the end of the shaft axis.

Adjusting mechanisms which answer to this definition already exist in various versions, but in general they are complicated in design, which makes them expensive, and also they are not always easy to operate for the utilizer.

To this aim, the invention mainly concerns a system for adjusting the position of a steering wheel comprising a rotating support for the shaft holding said steering wheel, which is connected to the steering system of the vehicle by means of a hinged transmission system, said support being hinged to a fixed base so that it is movable in a plane including the steering wheel shaft, characterized in that said support comprises a four link articulated quadrilateral mechanism comprised of a base link fastened to the vehicle and provided with two hinge means located at different levels, two crank links one adjustable longitudinally and the other one having adjustable slope and both hinged to a rod link supporting said shaft and locking means for locking both crank links in selected positions with respect to said basic link.

In an improved form of the design, the lower crank link is hinged to oscillate in the base link, and the upper crank link is hinged in the same base link, so that it moves longitudinally and oscillates. In this way, the lower crank link makes it possible to vary the height of the hinging point of the rod link held by the steering wheel, while the upper crank pin makes it possible to oscillate the latter within a horizontal plane in relation to the vehicle or, which comes to the same thing, it allows the longitudinal movement of the steering wheel in question.

Advantageously, the lower crank link is developed like a bracket hinged to a support fixed to the vehicle and which forms the basic link of the quadrilateral; this bracket is provided with a circular hole which plays on a bolt fixed to the support in question; on this bolt is hinged a tie-rod which comprises the upper crank link. Conventional means are also provided for locking the bracket and the tie-rod in relation to the support, in order to fix any required position adjusted.

In a later development of the above-mentioned characteristic, the hinge bolt of the tie-rod is equipped with an axial pressure device, actuated manually, in order to submit the tie-rod and the support bracket to friction. This means makes it possible to have one single control for the simultaneous locking of the steering wheel height and longitidunal movement adjustements.

Various conventional means can be employed for the locking by friction of the two crank links in relation to the fixed support which comprises the base link, however, in accordance with a prefered embodiment or the invention, the tie-rod and the bracket can comprise of be formed of a bundle of lamellar parts intercalated into each other within the hinging zone of the hinge bolt axis of the tie-rod.

The attached drawings show of a prefered embodiment of the invention.

Figure 2:
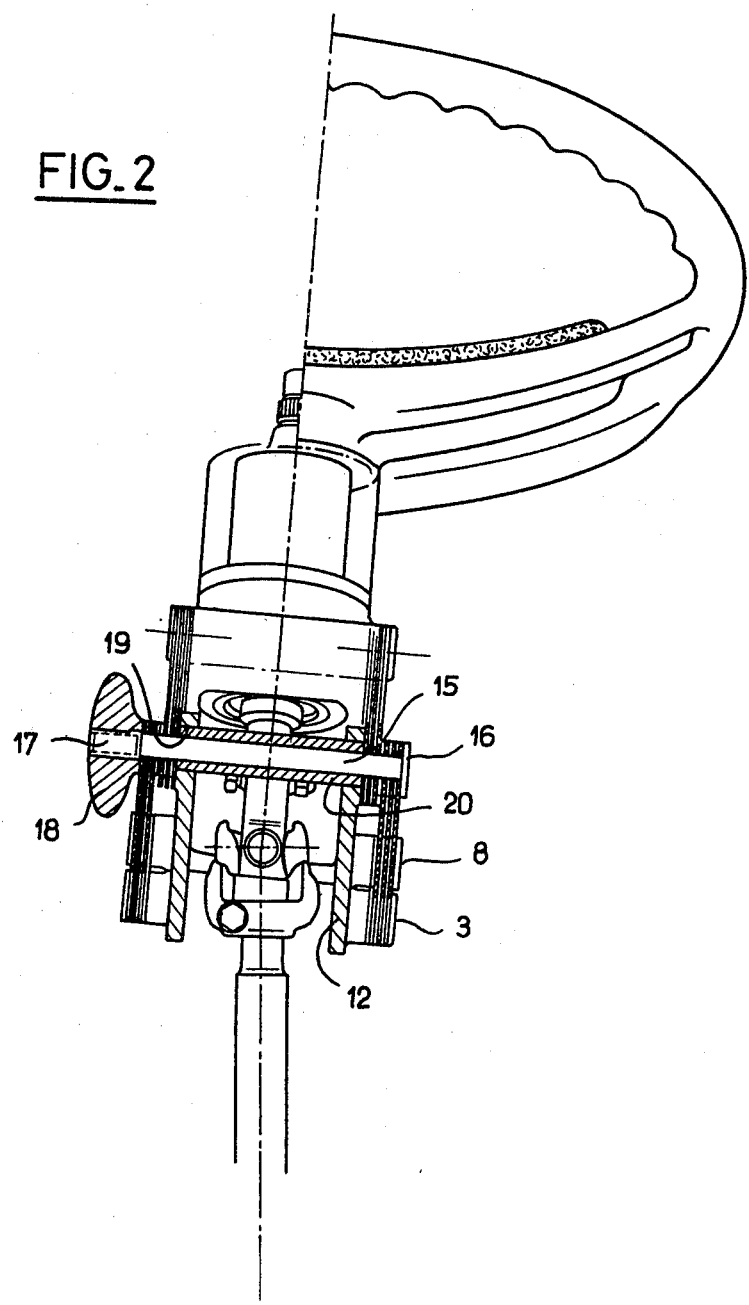

With regard to these drawings:

FIG. 1 shows a lateral elevation, with sections of parts, of a mechanism for adjusting the position of the steering wheel which includes the improvements of the invention; and FIG. 2 shows a front view of the same mechanism with a cross-section taken approximately at the line II—II of FIG. 1.

FIG. 1 clearly shows the four links of the articulated quadrilateral: the base link (1) which has two horizontal hinge means (2,3) separated vertically, the upper and lower crank links (4 and 5), respectively and the rod link (6), hinged to the two previous ones by shafts (7 and 8).

The fixed support or base link (1) is formed by a baseplate (9) which is fastened by screws (10) to the fixed structure of the vehicle, generally shown as (11). From the front surface of this plate, two vertical and parallel lugs (12) protrude towards the driver's seat, that is towards the right-hand side of FIG. 1. At the free ends of these lugs are fastened the two hinge means (2 and 3) for the crank links. Each of the crank links is in fact formed of two indentical links, and each one of these (upper and lower) is hinged to one of the lugs (12) of the fixed support (1).

Each of the lower identical crank links (5) is formed of a bundle of thin metal plates which can be seen on FIG. 2, they could also be formed of solid plates of the thickness shown, or more reduced.

In either case, they have the form of a bracket, generally triangular, with holes (not shown) on the apexes which are coupled to the hinge means (2, 3 and 8) mentioned above. As can be seen, the two shafts hinging to the fixed support are relatively close to each other, and the shaft (8) which corresponds to the rod link formed by the steering wheel rotating support, is relatively separated from the previous ones. Hinges (3) and (8) are fixed. On the other hand, hinge (2) is defined in links 5 by holes 14 shaped as a circumferential arc with its center at (3). Links 5 go through hinge shaft (15) mounted between cylindrical drillings of the lugs (12). In agreement with the latter, crank links (5) can oscillate in a vertical plane within the limits allowed by the holes (14), and the rod link (6), or steering wheel support, can move a vertical stroke which is amplified by the greater separation of hole (14) with respect to the previous ones.

The hinge shaft (15) crosses the whole assembly transversally; on one side (FIG. 2), is a head (16) which bears against the adjacent bracket, and on the other, a threaded rod (17) protudes on which is coupled an actuation pommel (18) which also bears against the corresponding bracket. Further, the drillings (19) of the lugs or blades (12) for passage of the shaft (15) are greater in diameter and house a spacer bushing (20) fitted around the shaft (15) and the length of which is equal to the distance which transversally separates the two outer surfaces of the blades. Thus, when the jut formed by the pommel (18) is tightened, the brackets and tie-rods (4), which form the upper crank links, are fixed by friction against the ends of the bushing, and the position of the elements of the hinged quadrilateral remains stabilized. It will be appreciated that each tie-rod (4) is also formed of a bundle of small metal plates, like the brackets, and its hinging orifice is formed of a long hole (21) which allows it to oscillate and to move longitudinally in relation to the hinge shaft (15).

The rod link (6) is a barrel which extends upwards to form a tapered seat (22) which receives the casing assembly (24), fastened by means of screws (23), for the shaft (25) of the steering wheel (13), and the lower end of this shaft is connected to the steering system of the vehicle by means of an articulated transmission device (26) of any conventional type and which must, of course, include a telescopic coupling to allow the vertical movements of the barrel (6).

The operation of the device described is obvious, while the pommel (18) is tightened, the assembly remains firmly in the position to which it was adjusted previously, but, as soon as the pommel (18) is loosened, the three elements (4, 5 and 6) are freed and can perform the movements defined by the hinges. Thus, the lower crank link (5) can oscillate around the hinge (3) within the limits set by the holes (14), so that the hinge (8) of the rod link (6) moves between two separate level limits, which varies the height of the steering wheel (13). Also, the upper crank links (4) can oscillate around the hinge shaft (15) and move longitudinally within the limits of the holes (21) so that the barrel (6) oscillates around the hinge (8) for the various slopes of the steering wheel. All these possibilities are shown in diagram form on FIG. 1 by means of dotted lines which represent different positions of the steering wheel (13).

The sequence of the operation thus described as an example can be applied to various modifications included within the scope of the invention. For instance, the hinge (3) could be equipped with a pressure device such as the one used under (2); in this manner the height of the steering wheel would be stabilized by means of this additional pressure device, and the variations of the slope, obtained by loosening the pommel (18), would not alter the previously set height adjustment. The height adjustement would obviously require the loosening of both pressure devices at once. Also, the thin metal plates which form elements (4 and 5) could be intercalated between each other in the zone of hinge (2) with the corresponding increase in the friction surface between the two elements, which would require less effort to fix the assembly in the position adjusted.

I claim:

1. A system for adjusting the position of a vehicle steering wheel comprising a rotating support for a shaft holding said steering wheel, said support being hinged to a fixed structure of the vehicle so that it is movable in a plane including the steering wheel shaft, said support comprising a four link articulated quadrilateral mechanism comprised of a base link fastened to the fixed structure of the vehicle and provided with two hinge means located at different levels, two crank links one adjustable longitudinally and the other one adjustable arcuately relative to said base link, both crank links being hinged to said base link and to a rod link supporting said shaft and locking means for locking both crank links in selected positions with respect to said base link.

2. A system for adjusting the position of a steering wheel in accordance with claim 1, wherein said support is comprised of a twin four link articulated quadrilateral mechanism.

3. A system for adjusting the position of a steering wheel in accordance with claim 1, wherein the other crank link is hinged to oscillate on said base link, and the one crank link is hinged to move longitudinally and oscillate on said base link.

4. A system for adjusting the position of a steering wheel in accordance with claims 1 or 3, wherein the other crank link is developed as a bracket hinged to the fixed structure of the vehicle, this bracket is equipped with a hole shaped as a circumferential arc which comes into play against a shaft of said base link and to which is hinged the one crank link, said locking means being provided for locking both crank links in relation to said rod link.

5. A system for adjusting the position of a steering wheel, in accordance with claim 4 wherein said shaft is equipped with a manually actuated axial pressure device for submitting both crank links to friction.

6. A system for adjusting the position of a steering wheel, in accordance with claim 5 wherein one of said crank links comprise or are formed of a bundle of laminar parts disposed in the zone of the hinge on said shaft.

* * * * *